United States Patent [19]

Mesiah

[11] 3,761,474

[45] Sept. 25, 1973

[54] PURIFICATION OF CRUDE CYANURIC ACID

[75] Inventor: Raymond N. Mesiah, Somerset, N.J.

[73] Assignee: FMC Corporation, New York, N.Y.

[22] Filed: Mar. 22, 1971

[21] Appl. No.: 127,021

[52] U.S. Cl............................................. 260/248 A
[51] Int. Cl............................................. C07d 55/36
[58] Field of Search............................... 260/248 A

[56] References Cited
UNITED STATES PATENTS
2,768,167   10/1956   Marzluff et al. .................... 260/248
2,943,088   6/1960   Westfall ............................. 260/248

*Primary Examiner*—John M. Ford
*Attorney*—Nicholas De Benedictis, Eugene G. Seems and Pauline Newman

[57] ABSTRACT

Crude cyanuric acid obtained by pyrolysis of urea is purified by extracting the impurities with an extraction acid solution. The extraction acid solution containing the impurities can then be digested to convert the impurities to cyanuric acid without any of the difficulties associated with digesting crude cyanuric acid in an acid slurry.

6 Claims, No Drawings

PURIFICATION OF CRUDE CYANURIC ACID

DESCRIPTION OF THE PRIOR ART

Cyanuric acid has the empirical formula $C_3H_3O_3N_3$ and is one of the many products obtainable by pyrolysis of urea, the equation being:

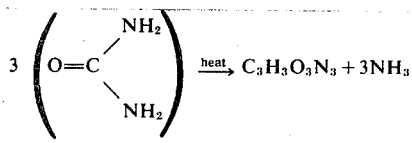

$$3\left(O=C\begin{matrix}NH_2\\ \\NH_2\end{matrix}\right) \xrightarrow{heat} C_3H_3O_3N_3 + 3NH_3$$

Unfortunately, this reaction does not occur alone but other products including amides of cyanuric acid, mostly ammeline and ammelide, are produced along with the cyanuric acid. These amides of cyanuric acid and other undesirable side products usually constitute approximately 20 percent of the product obtained by pyrolysis of urea with the remainder of the product being cyanuric acid. This product mixture obtained by the pyrolysis of urea is referred to hereinafter as crude cyanuric acid.

There are several processes for producing commercially pure cyanuric acid from crude cyanuric acid. These purification processes can be generally divided into two groups. The first group is those processes which separate the cyanuric acid from the impurities by dissolving the cyanuric acid, separating and then acidifying to reform and precipitate the cyanuric acid. The second group is those processes which purify the crude cyanuric acid by converting the impurities into cyanuric acid by acid hydrolysis. Examples of processes belonging to the first group are disclosed in U.S. Pat. No. 3,172,886 using ammonia as a solvent, U.S. Pat. No. 2,712,002 using an aldehyde as a solvent and U.S. Pat. 2,905,671 employing N,N-dialkylformaldehydes as a solvent.

The second group of processes for purifying the crude cyanuric acid employs acid hydrolysis which is sometimes referred to as acid digestion. Methods employing acid digestion for the purification of crude cyanuric acid are described in U.S. Pat. 2,768,167, 2,943,088 (columns 8 and 9) and 3,107,244. The acid digestion process consists of mixing crude cyanuric acid with sufficient dilute digesting acid, usually sulfuric acid, to give a slurry containing 10–5 percent undissolved solids. The slurry is digested at reflux temperature (103° C.) for 2–3 hours or at higher temperatures for shorter periods of time. This digestion in hot sulfuric acid hydrolyzes most of the impurities to cyanuric acid.

Because the digestion process involves heating and mixing a thick slurry of solids in a digester vessel many problems are encountered. Mixing in the digester vessel is poor with constant build-up of solids on the walls of the digester which decreases the effective volume. Frequently, large chunks of this solid build-up break away from the walls and either plug the exit lines or bend the agitator. An additional problem results when the cyanuric acid-sulfuric acid slurry is cooled prior to separation. As the slurry is cooled additional cyanuric acid precipitates from solution. This precipitation results in rather frequent plugging of the heat exchangers used for cooling the slurry. Commercial operation of an acid digestion process involving a hot cyanuric acid-sulfuric acid slurry is extremely difficult, hazardous and results in many shut downs because of clogged or broken equipment. A desirable process would be one that incorporates the advantages of converting the impurities into cyanuric acid along with eliminating the difficult handling of a hot cyanuric acid-sulfuric acid slurry for a prolonged digestion period.

SUMMARY OF THE INVENTION

Crude cyanuric acid obtained by pyrolysis of urea is purified by extracting the impurities with an extraction acid solution. The extraction takes place at moderate temperatures and for a relatively short extraction contact time. Under the preferred conditions for practicing my invention, approximately 95 percent of the impurities and only about 10 percent of the cyanuric acid are extracted from the crude cyanuric acid solids leaving approximately 70 percent of the solids as 98 percent pure cyanuric acid. Preferably, the extraction takes place using 20 percent sulfuric acid at about 70° C. and an extraction contact time of about 5 minutes. Even more preferably, after extraction the solution containing the impurities can be digested to convert the impurities to cyanuric acid.

DETAILED DESCRIPTION OF THE INVENTION

I have found that crude cyanuric acid obtained by pyrolysis of urea can be purified by extracting impurities with an extraction acid solution. The extraction acid solution containing the dissolved impurities can then be digested to hydrolyze the impurities to cyanuric acid without any of the problems associated with digesting a slurry of crude cyanuric acid. My process is based upon my discovery that the major impurities in crude cyanuric acid are much more soluble than cyanuric acid in certain dilute acids under specific conditions.

Acids useful in extracting impurities from crude cyanuric acid are those acids which are inert to cyanuric acid and which selectively dissolve a large percentage of the impurities present with the cyanuric acid without dissolving a large percentage of the cyanuric acid. The minimum selectivity for the extraction acid solution is that the percentage of impurities extracted by the solution must be greater than the percentage of cyanuric acid extracted by the solution. The preferred extraction selectively is for the solution to dissolve at least about 90 percent of the impurities and only a small amount of the cyanuric acid, e.g., about 20 percent or less. An extraction acid solution having this preferred selectivity will yield commercially pure cyanuric acid in a single stage extraction process with a product yield equal to at least 60 percent of the crude cyanuric acid feed. The number of extraction stages increases and the quantity of commercially pure cyanuric acid obtained after extraction decreases as the selectivity of the extraction solution approaches the minimum selectivity. Many strong acids possess the minimum required extraction selectivity; for example, hydrochloric, hydrobromic, sulfuric, nitric and phosphoric. However, the preferred acids are nitric and sulfuric, with dilute sulfuric acid (about 20 percent) most preferred.

A 20 percent sulfuric acid solution at about 70° C. will extract about 95 percent of the impurities and only about 10 percent of the cyanuric acid present in the crude cyanuric acid feed. This results in about 70 percent of the crude cyanuric acid feed being obtained directly as commercially pure cyanuric acid from a single extraction stage with the dilute warm sulfuric acid solution. Acid concentrations of from about 10 to about 35 percent are preferred for the extraction process with concentrations at about 15–25 percent being particularly preferred. The selectivity of an acid generally tends to decrease as its concentration increases above about 30 percent. Concentrations below about 10 percent, although effective, require a large volume of solution which necessarily decreases the efficiency of the process.

Based upon my discovery, I have invented a process for selectively extracting the impurities from crude cyanuric acid by mixing the crude cyanuric acid with the dilute extraction acid solution at moderately elevated temperatures for short extraction periods and then separating the remaining solids from the extraction acid solution.

The concentration of the dilute extraction acid, the temperature during extraction and the extraction time are interrelated in that higher temperatures and moderate concentrations, e.g., about 20 percent sulfuric acid solutions at about 70° C., tend to decrease the required contact time for extraction to take place. At the end of the extraction the warm slurry is filtered and the resulting filter cake washed with a small quantity of warm water in order to remove the residual sulfuric acid. The washed filter cake is substantially purer cyanuric acid than the crude cyanuric acid feed.

My acid extraction process under preferred conditions selectively removes approximately 95 percent of the impurities and only about 10 percent of the cyanuric acid from a typical crude cyanuric acid containing about 80 percent cyanuric acid and about 20 percent impurities. This leaves about 70 percent of the original crude cyanuric acid as a product which after drying is about 98 percent pure cyanuric acid. This 98 percent purity is acceptable as commercially pure cyanuric acid.

After the extraction and filtering step, the extraction acid solution contains most of the impurities and only a small amount of the cyanuric acid that were originally present in the crude cyanuric acid feed. This solution can be subjected to known acid hydrolysis (digestion) processes to hydrolyze the impurities to cyanuric acid.

An advantage of my purification process for crude cyanuric acid is that a substantial amount of the crude cyanuric acid is obtained in a pure form directly by selectively extracting the impurities. About 30 percent of the crude cyanuric acid is extracted by my selective extraction process under preferred conditions and this 30 percent contains most of the impurities and only a small amount of the cyanuric acid originally contained in the crude cyanuric acid. The extraction acid solution containing the impurities can then be digested to acid hydrolyze the impurities to cyanuric acid. Therefore, the purification process provided by my invention in combination with acid digestion represents an important improvement because it eliminates the need for acid digestion of about 70 percent of the crude cyanuric acid and also eliminates all the difficulties of digesting a hot slurry of cyanuric acid and digesting acid.

The selective extraction process is carried out by contacting the crude cyanuric acid with an extraction acid solution, preferably warm sulfuric acid (about 65° C.) for sufficient time for substantial extraction to occur and then separating the solution from the remaining purified cyanuric acid solids. The solution after extraction and separation contains most of the impurities and can be heated, preferably to reflux temperature, to acid hydrolyze the impurities in solution to convert them to cyanuric acid according to known procedures for digestion. After the extraction acid solution has been digested to convert the impurities to cyanuric acid, the solution is cooled to precipitate the cyanuric acid and filtered. This precipitated cyanuric acid is usually very pure (about 99 percent) and represents approximately 25 percent of the original crude cyanuric acid. The solution after digestion, cooling and filtering can be reused by warming it to the desired extraction temperature and adjusting its extraction acid concentration with some fresh acid.

A substantial quantity of extraction solution is required, that is, at least 2 parts by weight extraction solution are required per part of crude cyanuric acid feed. The preferred amount of extraction solution is about 10 parts by weight per part of crude cyanuric acid when the extraction temperature is about 65°–75° C. and the solution is sulfuric acid. Both single-stage and multi-stage extraction techniques can be employed.

The contact time necessary to practice the extraction process depends to a considerable extent on the temperature used, the type, concentration and amount of extraction solution employed. The contact time must be sufficient to permit the extraction solution to extract a substantial amount of the impurities from the crude cyanuric acid. Normally this contact time is on the order of 5 minutes when the extraction temperature is about 70° C. Contact times of about 2 minutes are functional although not very efficient except at the higher extraction temperatures or small particle size.

It is not necessary nor is it desirable to permit the extraction solution to be in contact with the crude cyanuric acid for sufficient time or at sufficiently elevated temperatures to cause substantial acid hydrolysis of the impurities into cyanuric acid. At temperatures below about 165° C. the reaction rate for acid hydrolysis of the impurities into the cyanuric acid is slow. At temperatures of about 100° C., several hours are required for acid hydrolysis to approach completion. Therefore, at higher extraction temperatures the extraction contact time should be relatively short in order to prevent substantial acid hydrolysis. Examples of extraction temperatures and their corresponding maximum extraction contact times are as follows: about 5 minutes at 165° C., about 20 minutes at 100° C., and about 35 minutes at 70° C. Temperatures between 165° C. and 70° C. have corresponding maximum extraction times between 5 and 35 minutes respectively. At temperatures below about 70° C. there is no real maximum limitation on contact time other than a practical one. It is preferred to conduct the extraction at temperatures of about 70° C. and for short contact times of about 5 minutes or less.

The following examples serve to illustrate without limiting my invention. All parts and percentages are by weight unless otherwise stated.

EXAMPLE 1

A slurry was prepared by mixing a 50 g. sample of crude cyanuric acid (80 percent cyanuric acid, 20 percent impurities) with 500 g. of 20 percent sulfuric acid. The slurry was maintained between 70 and 75° C. for 5 minutes. The slurry was filtered and the solids washed with two 25 ml. portions of water. After drying the solids weighed 35.6 g. and analyzed 98.7 percent cyanuric acid, 1 percent insoluble impurities and 0.1 percent sulfuric acid. The procedure was repeated with slurries containing 56.1 g. crude cyanuric acid and an extraction acid in an amount and concentration indicated in Table I. The slurries were maintained for 5 minutes at the temperatures indicated in Table I, and then filtered. The quantities and purities of product obtained after filtering are shown in Table I.

TABLE I — Purification of Crude Cyanuric Acid

| Run number | Extraction acid Type | Conc. (percent) | Grams (g.) | Extraction temp. °C. | Solid product Grams | Cyanuric acid (percent) |
|---|---|---|---|---|---|---|
| 1 | $H_2SO_4$ | 20 | 500 | 73–75 | 39.2 | 98.2 |
| 2 | $H_2SO_4$ | 15 | 500 | 73–75 | 40.1 | 96.2 |
| 3 | $H_2SO_4$ | 20 | 500 | 65–70 | 41.5 | 98.0 |
| 4 | $H_2SO_4$ | 20 | 500 | 50–55 | 46.0 | 91.8 |
| 5 | $H_2SO_4$ | 30 | 500 | 70–73 | 41.9 | 98.2 |
| 6 | $H_2SO_4$ | 20 | 500 | 25 | 48.3 | 83.3 |
| 7 | $H_2SO_4$ | 20 | 1000 | 25 | 43.7 | 97.3 |
| 8 | $H_2SO_4$ | 30 | 1000 | 25 | 45.3 | 94.7 |
| 9 | $H_3PO_4$ | 20 | 500 | 75 | 45.5 | 86.0 |
| 10 | HCl | 20 | 500 | 75 | 45.6 | 91.5 |
| 11 | $HNO_3$ | 20 | 500 | 74 | 38.6 | 99.1 |
| 12 | $H_2SO_4$ | 20 | 500 | 70 | 41.9 | 98.2 |
| 13 | $H_2SO_4$ | 20 | 500 | 71 | 42 | 99.7 |
| 14 | $H_2SO_4$ | 20 | 500 | 50 | 46 | 91.8 |

EXAMPLE 2

An extraction cycle was performed as follows.

A slurry was prepared by mixing 50 g. of crude cyanuric acid (80 percent cyanuric acid and 20 percent impurities) with 500 g. of 20 percent sulfuric acid. The slurry was maintained for 5 minutes between 70° and 75° C. The warm slurry was then filtered and the solids washed with two 50 ml. portions of 65° C. water. The washed solids after drying weighed 35.6 g. and analyzed 98.7 percent cyanuric acid and 1 percent insoluble impurities. The wash water was combined with the filtrate and the combination was heated at reflux temperature (102° C.) for 2 hours. The combination was then cooled to room temperature which caused solids to precipitate. The cooled refluxed solution was filtered and the solids were washed with two 15 ml. portions of water. The solids after drying weighed 9.69 g. and analyzed 100 percent cyanuric acid. The total amount of solids recovered was 45.2 g. for an overall yield of 90.4 percent. After filtering, the cooled reflux solution was regenerated into an extraction solution by discarding 10 percent of the filtrate and adding sufficient concentrated sulfuric acid and water to the remaining 90 percent to make 500 g. of 20 percent sulfuric acid solution.

The extraction cycle was repeated three times using as the extraction solution the regenerated sulfuric acid solution obtained from the previous cycle. The results are reported in Table II. The washed solids were at least 98 percent pure cyanuric acid and the digested solids were at least 99.5 percent pure cyanuric acid.

TABLE II

RECYCLING OF THE EXTRACTION ACID

| Cycle No. | Crude Cyanuric Acid grams. | Washed Solids grams. | Digested Solids grams. | Combined Yield % of feed |
|---|---|---|---|---|
| 1 | 50 | 35.6 | 9.6 | 90.4 |
| 2 | 50 | 36.7 | 11.8 | 97.0 |
| 3 | 50 | 36.4 | 11.7 | 96.2 |
| 4 | 50 | 35.8 | 12.9 | 97.4 |

What is claimed is:

1. In the process of purifying crude cyanuric acid solids employing digesting a slurry of the crude cyanuric acid solids in a hot digestion acid to acid hydrolize impurities to cyanuric acid, the improvement which comprises, before digesting, contacting the crude cyanuric acid solids at a moderate temperature with an extraction acid solution for an amount of time sufficient to permit extraction of a majority of the impurities from the crude cyanuric acid solids, separating the extraction acid solution from the remaining solids and digesting only the extraction acid solution containing the impurities.

2. The process of claim 1 in which the extraction solution is present in an amount greater than 200 percent of the weight of the crude cyanuric acid.

3. The process of claim 1 in which the extraction acid solution is selected from the group consisting of sulfuric, nitric, hydrobromic, hydrochloric and phosphoric acids.

4. The process of claim 1 in which the extraction solution is an aqueous sulfuric acid solution contained between 10 and 30 percent sulfuric acid.

5. The process of claim 1 in which the temperature during extraction is between 65° and 75° C.

6. The process of claim 1 in which the contacting time is about 10 minutes.

* * * * *